(12) United States Patent
Lang et al.

(10) Patent No.: US 9,715,076 B2
(45) Date of Patent: Jul. 25, 2017

(54) OPTICAL CABLE FOR TERRESTRIAL NETWORKS

(71) Applicant: PRYSMIAN S.P.A., Milan (IT)

(72) Inventors: Ian Dewi Lang, Milan (IT); Paul John Roberts, Milan (IT); Martin Vincent Davies, Milan (IT); Ralph Sutehall, Milan (IT)

(73) Assignee: PRYSMIAN S.P.A., Milan (IT)

( * ) Notice: Subject to any disclaimer, the term of this patent is extended or adjusted under 35 U.S.C. 154(b) by 0 days.

(21) Appl. No.: 14/906,955

(22) PCT Filed: Jul. 29, 2013

(86) PCT No.: PCT/EP2013/065930
§ 371 (c)(1),
(2) Date: Jan. 22, 2016

(87) PCT Pub. No.: WO2015/014385
PCT Pub. Date: Feb. 5, 2015

(65) Prior Publication Data
US 2016/0161697 A1  Jun. 9, 2016

(51) Int. Cl.
*G02B 6/44* (2006.01)

(52) U.S. Cl.
CPC .......... *G02B 6/4495* (2013.01); *G02B 6/447* (2013.01); *G02B 6/4413* (2013.01); *G02B 6/4482* (2013.01)

(58) Field of Classification Search
CPC .... G02B 6/4495; G02B 6/4413; G02B 6/447; G02B 6/4482
See application file for complete search history.

(56) References Cited

U.S. PATENT DOCUMENTS

| | | | | |
|---|---|---|---|---|
| 4,718,747 A | * | 1/1988 | Bianchi | G02B 6/4401 385/103 |
| 4,902,096 A | * | 2/1990 | Calzolari | G02B 6/4407 385/110 |

(Continued)

FOREIGN PATENT DOCUMENTS

| | | |
|---|---|---|
| EP | 0 297 409 | 1/1989 |
| EP | 1 217 350 | 6/2002 |

(Continued)

OTHER PUBLICATIONS

International Search Report from the European Patent Office for International Application No. PCT/EP2013/065930, mailing date Apr. 2, 2014.

*Primary Examiner* — Ryan Lepisto
(74) *Attorney, Agent, or Firm* — Finnegan, Henderson, Farabow, Garrett & Dunner, L.L.P.

(57) ABSTRACT

An optical cable includes an optical core and sheath enclosing the optical core. The optical core includes a number of optical units having respective colors and being wound about a longitudinal axis of the cable. The sheath includes at least one non opaque longitudinal section through which a sequence of colors of the optical units is visible from outside the cable. The color sequence acts as an identifier for the cable. The cable may therefore be easily identified (e.g. amongst other cables laid down within the same duct) by a simple visual inspection of the cable's inner structure through the non opaque section(s) of its external sheath.

20 Claims, 2 Drawing Sheets

(56) References Cited

U.S. PATENT DOCUMENTS

| | | | | |
|---|---|---|---|---|
| 5,982,967 A | * | 11/1999 | Mathis | G02B 6/4482 |
| | | | | 385/102 |
| 6,347,172 B1 | * | 2/2002 | Keller | G02B 6/0006 |
| | | | | 385/102 |
| 7,272,283 B2 | * | 9/2007 | Temple, Jr. | G02B 6/4404 |
| | | | | 385/109 |
| 7,468,489 B2 | * | 12/2008 | Alrutz | H01B 7/366 |
| | | | | 174/112 |
| 2002/0081082 A1 | | 6/2002 | Rossi et al. | |
| 2005/0238300 A1 | | 10/2005 | Jamet et al. | |
| 2006/0106374 A1 | * | 5/2006 | Moran | A61B 18/22 |
| | | | | 606/16 |

FOREIGN PATENT DOCUMENTS

| | | |
|---|---|---|
| WO | WO 2004/070446 | 8/2004 |
| WO | WO 2013/045583 | 4/2013 |

\* cited by examiner

OPTICAL CABLE FOR TERRESTRIAL NETWORKS

CROSS REFERENCE TO RELATED APPLICATION

This application is a national phase application based on PCT/EP2013/065930, filed Jul. 29, 2013, the content of which is incorporated herein by reference.

TECHNICAL FIELD

The present invention relates to the field of optical cables. More particularly, the present invention relates to an optical cable for terrestrial networks, in particular—but not exclusively—optical access networks such as FTTH (Fiber To The Home) networks and FTTP (Fiber To The Premises) networks.

BACKGROUND ART

As known, an optical cable typically comprises an optical core including one or more optical fibers and an external sheath enclosing the optical core. The external sheath is typically made of a polymeric material and has the primary function of protecting the optical core from the mechanical point of view.

Within the external sheath, the optical fibers may be arranged in various ways. In particular, in the so-called "loose tube cables", the optical fibers are loosely arranged within one or more buffer tubes. Each buffer tube typically contains multiple fibers, and the individual fibers are free to move relative to one another within the buffer tube. In the so-called "central loose tube cables" (briefly, CLT cables), all the optical fibers of the cable are loosely arranged within a single buffer tube, which is in turn enclosed by the external sheath. In the so-called "multi loose tube cables" (briefly, MLT cables), the optical fibers are instead divided into multiple bundles (e.g. 3, 4 or 6 bundles), the optical fibers of each bundle being loosely arranged within a respective buffer tube so as to form an optical unit. The buffer tubes are then stranded according to an open helix or S-Z arrangement, typically about a central strength member. A binder may also be provided around the buffer tubes for retaining them. Both in CLT cables and in MTL cables, the external sheath may comprise two side strength members (typically made of steel or fiber reinforced resin) embedded within the sheath's thickness and placed at diametrically opposed positions.

Loose tube cables are typically used for applications where the optical fibers must be individually extracted from the cable and spliced, e.g. in FTTH and FTTP applications. For instance, drop cables of FTTH or FTTP networks are typically implemented as CLT or MLT cables with a particularly reduced diameter (less than 10 mm).

In FTTH or FTTP networks (and more generally in terrestrial networks), several cables are typically laid down within a same duct, for instance an underground duct in case of metro networks or a vertical duct fixed to or embedded within a wall of a building, in case of FTTH or FTTP application.

For allowing identification of the various cables laid down within the same duct, it is known providing the various cables with respective identification codes printed on the external surface of their sheaths. The codes are typically printed by an ink-jet printing technique.

U.S. Pat. No. 6,347,172 discloses a fiber optical communication cable comprising an optical fiber, a PVC buffer, an aramid strength layer and a cable jacket. According to one embodiment, a side emitting optical fiber is embedded within (or positioned underneath) a translucent section of the jacket, which allows the side emitting optical fiber to be observed therethrough. The remaining portion of the jacket is made of an opaque material. Alternatively, all the cable jacket is made of translucent material. According to other embodiments, the side emitting optical fiber is located at an outer perimeter of the jacket, embedded within an additional cable jacket, which is the cable outermost layer. The translucent jacketing material may be tinted with or without shading pigment and allows the side emitting fiber to be seen when illuminated with a dedicated light source. Additionally, the side emitting fibers may be clear or tinted with color (e.g. violet). When a detecting light is put into the ends of a number of cables, the individual cable emitting a violet light along its axis may be detected amongst the various other cables (i.e. red, blue, clear, green, etc.).

SUMMARY OF THE INVENTION

The inventors have noticed that known techniques for identifying cables described above exhibit some drawbacks.

As to ink-jet printing of identification codes on the cable sheath, it is disadvantageous in that friction of the cable against other cables and/or against the walls of the duct may abrade the sheath surface, thereby making the identification codes hardly readable or even totally unintelligible.

As to the solutions disclosed in U.S. Pat. No. 6,347,172, they are disadvantageous in that, first of all, side emitting optical fibers are quite expensive. Their inclusions in the cable structure therefore raises the overall cost of the cable, which is undesired especially in cables for FTTP or FTTH applications that should be as inexpensive as possible. Furthermore, the inclusion of the side-emitting fiber within the cable structure entails the need to increase the cable diameter, which is undesired especially in cables for FTTP or FTTH applications that are typically subject to very narrow constraints in terms of outer diameter. Furthermore, for allowing identification of the cable, it is necessary coupling a dedicated light source to the side emitting fiber at one end of the cable. Such operation is rather inconvenient, especially when the position at which the cable shall be identified is far from both ends of the cable. Furthermore, side emitting fibers typically exhibit very high optical losses, and accordingly light up over rather short distances. If one wishes to enable identification of the cable over its whole length, the maximum length of the cable is accordingly limited by the absorption of the side emitting fiber.

In view of the above, the Applicant has tackled the problem of providing an optical cable for terrestrial networks (in particular, but not exclusively, FTTH or FTTP networks), which overcomes at least one of the aforesaid drawbacks.

In particular, the Applicant has tackled the problem of providing an optical cable for terrestrial networks (in particular, but not exclusively, FTTH or FTTP networks), which may be easily and reliably identified amongst other cables over its whole length, without requiring any additional element which might entail an increase of the cable outer diameter and/or cable cost.

The Applicant found that the above problem is solved by an optical cable comprising an optical core and a sheath enclosing the optical core, wherein the optical core comprises one or more optical units having respective colors (e.g. the colors defined by the standard EIA/TIA—598) and a sheath which comprises one or more non opaque longitudinal sections, through which portions of the optical units are visible from outside the cable. According to the present invention, the optical units are wound about a longitudinal axis of the cable (e.g. about its central strength member, if any) according to either a closed helix pattern or an "S-Z" pattern. Since the optical units are wound about the longitudinal axis of the cable while the non opaque longitudinal section(s) is/are parallel to the longitudinal axis of the cable, an inspection of the inner cable's construction through the non opaque longitudinal section(s) reveals a sequence of colors of the optical units.

In the present description and in the claims, the expression "optical unit" will designate an assembly comprising one or more optical fibers for telecommunication applications and a buffer tube, in which the fibers are arranged and which carries out the function of retaining the fibers and, optionally, protecting them against mechanical stresses.

Further, in the present description and in the claims, the expression "translucent material" will designate a material allowing light to pass through, wherein photons are scattered at either of the two surfaces of the translucent material (where there is a change of the refraction index) or within the thickness of the material. Furthermore, in the present description and in the claims, the expression "transparent material" will designate a material allowing light to pass through without being scattered, photons being refracted according to the known Snell's law. Furthermore, in the present description and in the claims, the expression "non opaque material" will designate either a transparent material or a translucent material.

Therefore, according to the present invention, the optical units themselves (in particular their buffer tubes, as it will be described in detail herein after) are exploited for cable identification purposes, by making their colors visible through non opaque section(s) of the cable sheath.

This entails a number of advantages.

First of all, the cable may be easily identified by the operator through a simple visual inspection of the cable, which is as such a very simple operation that may be carried out at any point of the cable.

Identification may then be carried out over the whole cable length, with no restriction on the maximum cable length and without requiring any coupling to light source.

Furthermore, no additional elements dedicated to identification purposes need to be included in the cable structure, and therefore no increase of the cable size due to inclusion of such element(s) is needed.

Furthermore, the identification is made in a "passive" way with no need of any dedicated light sources.

Furthermore, sheath abrasions due to friction of the cable against other cables or walls of the duct do not impair the identifiability of cable, since the cable identification is based on visibility of the colors of the optical units, which are safely enclosed within the sheath. For the same reason, the cable is also very safe from the security/traceability point of view, since its identification code can not be tampered.

Moreover, several identification codes are available, because several different sequences of colors of the optical units may be provided, as it will be discussed in detail herein after.

In one aspect, the present invention relates to an optical cable comprising an optical core and a sheath enclosing the optical core, wherein:

the optical core comprises a number of optical units having respective colors and being wound about a longitudinal axis of the cable; and the sheath comprises at least one non opaque longitudinal section through which a sequence of colors of the optical units is visible from outside the cable.

Preferably, the sheath further comprises at least one opaque longitudinal section complementary to the at least one non opaque longitudinal section.

According to some embodiments, the angular width of the at least one opaque longitudinal section is lower than the angular width of the non opaque longitudinal section.

According to such embodiments, the at least one opaque longitudinal section is optionally provided with a groove or notch.

Further, according to such embodiments, the at least one opaque longitudinal section is provided with alphanumeric information relating to the cable.

According to other embodiments, the angular width of the at least one opaque longitudinal section is higher than the angular width of the non opaque longitudinal section.

According to such embodiments, the at least one non opaque longitudinal section is provided with a groove or notch.

Further, according to such embodiments, the at least one non opaque longitudinal section is provided with alphanumeric information relating to the cable.

Preferably, the at least one non opaque longitudinal section is clear.

Alternatively, the at least one non opaque longitudinal section is tinted by a color different from a color of the at least one opaque longitudinal section.

According to advantageous variants, the cable further comprises an elongated identification element arranged between the optical core and the sheath so as to be visible from outside the cable through the at least one non opaque longitudinal section of the sheath.

Preferably, the elongated identification element comprises a tape provided with alphanumeric information relating to the cable.

Preferably, the elongated identification element is arranged parallel to the longitudinal axis of the cable underneath the at least one non opaque longitudinal section of the sheath.

Alternatively, the elongated identification element is wound about a longitudinal axis of the cable.

In another aspect, the present invention relates to a process for manufacturing an optical cable, the process comprising:

providing an optical core comprising a number of optical units having respective colors and being wound about a longitudinal axis of the cable; and forming a sheath enclosing the optical core, wherein the sheath comprises at least one non opaque longitudinal section through which a sequence of colors of the optical units is visible from outside the cable.

BRIEF DESCRIPTION OF THE DRAWINGS

The present invention will become fully clear by reading the following detailed description, to be read by referring to the accompanying drawings, wherein.

DETAILED DESCRIPTION OF PREFERRED EMBODIMENTS OF THE INVENTION

FIGS. 1 to 4 are not in scale.

Figure 1:
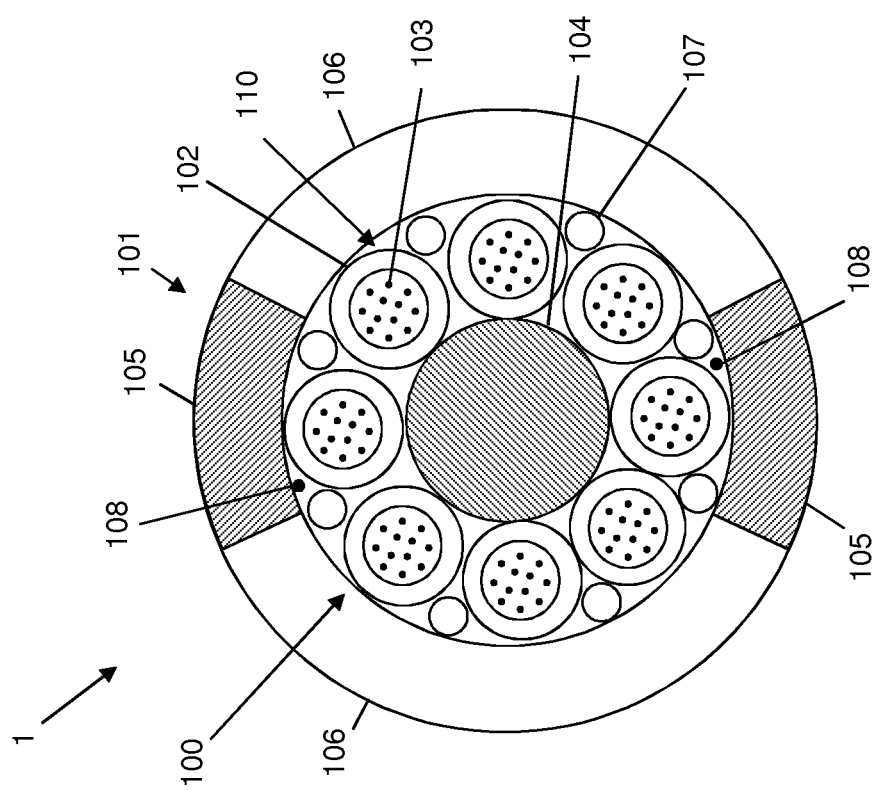
FIG. 1 is a cross-section view of an optical cable according to a first embodiment of the present invention.

FIG. 1 shows an optical cable 1 according to a first embodiment of the present invention. The optical cable 1 according to the first embodiment of the present invention is a multi-loose tube cable for terrestrial networks.

The optical cable 1 comprises an optical core 100 and an external sheath 101 surrounding the optical core 100.

The optical core 100 comprises a number of optical units 110 (by way of non limiting example, eight optical units 110) circumferentially disposed close to the inner surface of the sheath 101. Each optical unit 110 comprises a respective buffer tube 102 and a respective number of optical fibers 103 loosely arranged within the buffer tube 102. The number of optical fibers 103 for each optical unit 110 preferably ranges from 1 to 12. By way of non limiting example, in the cable shown in FIG. 1 each unit 110 comprises 12 optical fibers 103, the fiber count being equal to 96. One or more optical units 110 may be replaced by corresponding fillers, if a lower fiber count is requested. The optical fibers 103 are preferably single mode fibers compliant with ITU-T G652 standard.

Each buffer tube 102 is preferably made of a thermoplastic polymeric material, for instance PBT (polybutylene terephthalate). Furthermore, each buffer tube 102 has a respective color. The colors of the buffer tubes 102 are preferably compliant with the optical fiber cable color coding defined by the standard EIA/TIA—598. In each optical fiber unit 110, the interstices between the optical fibers 103 are preferably filled with a water-blocking material, e.g. a thixotropic gel. The outer diameter of each buffer tube 102 is preferably comprised between 1 mm and 2 mm, more preferably between 1.4 mm and 1.6 mm.

The optical core 100 also preferably comprises a central non-metallic strength member 104. The central strength member 104 preferably is made of glass reinforced plastic (briefly, GRP). The optical fiber units 110 are preferably stranded around the strength member 104 according to a close helix or open helix (namely, S-Z) configuration having a predetermined stranding angle and a predetermined stranding pitch.

The sheath 101 preferably comprises two first longitudinally extending sections 105 made of a first, opaque material and two second longitudinally extending sections 106 made of a second, non opaque material.

According to the first embodiment, the angular width of each first opaque section 105 is preferably lower than the angular width of each second non opaque section 106. In particular, the angular width of each opaque section 105 is preferably lower than 90°, whereas the angular width of each non opaque section 106 is preferably higher than 90°. More preferably, the angular width of each opaque section 105 is comprised between 40° and 70°, whereas the angular width of each non opaque section 106 is comprised between 110° and 140°. The opaque sections 105 are preferably placed at diametrically opposed positions. According to other embodiments not shown in the drawings, the opaque sections 105 are spaced apart by an angle different from 180°. According to still further embodiments not shown in the drawings, the sheath 101 comprises a single opaque section 105. According to still further embodiments not shown in the drawings, the sheath 101 comprises three or more opaque sections arranged (e.g. evenly distributed) along the perimeter of the sheath 101.

Both the opaque sections 105 and the non opaque sections 106 preferably have substantially a same thickness, so that the sheath 101 has a substantially uniform thickness along its perimeter. The thickness of the sheath is preferably comprised between 0.2 mm and 0.8 mm. Furthermore, preferably, the sheath 101 has a substantially uniform outer diameter along its perimeter. The outer diameter of the sheath 101 is preferably comprised between 5 mm and 10 mm, more preferably between 5 mm and 7 mm, even more preferably between 6 mm and 6.5 mm.

The non opaque material of the second sheath sections 106 may be either a transparent material or a translucent material. Furthermore, the non opaque material of the second sheath sections 106 may be clear or tinted, preferably by a color different from that of the opaque material of the first sections 105. The non opaque material is further preferably subject to an UV stabilization treatment, which improves its lifetime performance. Preferably, both the opaque material and the non opaque material of the sheath 101 are polymer materials, more preferably polymer materials comprising polyethylene.

Optionally, the opaque material of the first sheath sections 105 has a lower fracture toughness than the non opaque material of the second sheath sections 106. This advantageously eases the operation of removing the sheath 101 from the cable 1, as it will be discussed in detail herein after. Furthermore, the opaque material and the non opaque material are preferably compatible from the mechanical point of view, in particular they exhibit substantially the same hardness and properties of reciprocal adhesion. In particular, the opaque and non opaque materials are preferably different mixtures comprising a same compound, e.g. polyethylene. This provides a strong and continuous bond between the sectors 105 and 106, thereby providing the sheath 101 with mechanical stability and improving its mechanical protection performance.

The Applicant made positive tests using, as first opaque material, black PEND (Borealis 6063 or 6067) and, as second non opaque material, UV-stabilized natural HDPE (Borealis 6063 or 6068).

The sheath 101 is preferably extruded by a dual extrusion equipment comprising two extruders (one for each material of the sheath) feeding into a single cross head from different inlet points. A cartridge is fitted into the cross head, which splits the flow of second, non opaque material provided by one of the two extruders, so as to form a circumferentially closed non opaque tube of second material that surrounds the optical core 100. The first opaque material provided by the other extruder is instead fed to a plate arranged in front of the cross head, which is configured to divide the flow of first material into two half-flows and increase their pressure so as to allow them to penetrate through the thickness of the non opaque material, thereby forming the first opaque sections 105 of the sheath 101.

According to embodiments not shown in the drawings, the opaque sections 105 may exhibit optional grooves or notches in order to ease removal of the sheath 101 from the cable 1, as it will be discussed in detail herein after.

Furthermore, the opaque sections 105 may be provided with alphanumeric information relating to the cable 1. The alphanumeric information are printed on the outer surface of at least one (preferably both) the opaque sections 105 of the sheath 101 by means of an ink-jet printing technique. The alphanumeric information relating to cable 1 are preferably repeated periodically along each one of the opaque sections 105 at predefined intervals of e.g. 1 meter. Such alphanumeric information may comprise for instance: sequential length mark, fiber count of cable 3, logo of the cable manufacturer and year of manufacture.

The cable 1 further comprises a number of water blocking elements 107 configured to substantially fill the free spaces amongst the optical fiber units 110 within the sheath 101.

The cable 1 also comprises two optional ripcords 108 arranged underneath the sheath 101 at substantially diametrically opposed positions. The ripcords 108 are preferably arranged parallel to the longitudinal axis of the cable 1. Preferably, both the ripcords 108 are arranged underneath the opaque sections 105 of the sheath 101, so that they do not interfere with the non opaque sections 106.

When the cable 1 is laid with several other cables e.g. in a duct, an operator may easily identify it. The non opaque sections 106 of the sheath 101 indeed allows a visual inspection of the inner structure of the cable 1, namely its optical core 100. In particular, the buffer tubes 102 of the optical units 110 (which, as mentioned above, are arranged immediately underneath the sheath 101 and are stranded according to an S-Z arrangement) are visible from outside the cable 1 through the non opaque sections 106 of the sheath 101. A visual inspection of the inner cable structure 1 through the non opaque sections 106 of the sheath 101 therefore reveals an ordered sequence of colors, namely the colors of the buffer tubes 102, which is periodically repeated at each stranding pitch of the buffer tubes 102 over the whole length of the cable 1. The ordered sequence of colors of the buffer tubes 102 (possibly in combination with the color of the opaque sheath sections 105 and/or with the optional alphanumeric information printed on the outer surface of the opaque sheath sections 105) basically acts as an identification code of the cable 1, which allows the operator distinguishing the cable 1 amongst the other cables laid within the same duct.

Therefore, according to this first embodiment, the buffer tubes 102 themselves, which are provided for in standard multi-loose tube cables with the aim of grouping the optical fibers in bundles and protecting them from the mechanical point of view, are exploited also for identification purposes. This entails a number of advantages.

First of all, the cable 1 may be easily identified by the operator through a simple visual inspection of the cable, which is as such a very simple operation that may be carried out at any point of the cable. Identification may then be carried out over the whole cable length, with no restriction on the maximum cable length and without requiring any coupling to light source. Cable identification is particularly easy also because the sheath 101 is non opaque for the most part, thereby allowing a very easy visual inspection of the inner structure of the cable.

Furthermore, no additional elements dedicated to identification purposes need to be included in the cable structure, and therefore no increase of the cable size due to inclusion of such element(s) is needed. The cable 1 therefore advantageously has structure and size fully compliant with standards relating to multi-loose tube cables.

Furthermore, sheath abrasions due to friction of the cable 1 against other cables or walls of the duct do not impair the identifiability of cable 1. Identification of cable 1 is indeed based on visibility of the colors of buffer tubes 102, which are safely enclosed within the sheath 101 that mechanically protects them against any abrasion. For the same reason, cable 1 is also very safe from the security/traceability point of view, since its identification code can not be tampered.

Moreover, several identification codes are available, because several different sequences of colors of the buffer tubes 102 may be provided. In general, if the cable comprises Nt buffer tubes and each buffer tube may be of Nc>Nt different colors, the number of possible ordered color sequences is give by the following equation:

$$\binom{Nc}{Nt} = \frac{Nc!}{(Nc-Nt)!}$$

Therefore, a much higher number of cables may be assigned to respective unique identification codes than if the color of a single element (e.g. a side emitting optical fiber) were used for identification purposes. Such number is further increased if it is assumed that the identification code of the cable 1 is composed by the combination of the color sequence of its buffer tubes 102 and the color of the opaque sections 105 of its sheath 101.

Furthermore, visibility of the buffer tubes 102 through the non opaque sections 106 of the sheath 101 advantageously allows locating, along the cable length, the points at which the winding direction of the optical units 110 is reversed from clockwise to counter-clockwise or vice-versa. Localizing such points is advantageous in that cutting the cable 1 at such points for allowing mid-span access to the cable 1 is preferable.

Furthermore, visibility of the buffer tubes 102 through the non opaque sections 106 of the sheath 101 is independent of the circumferential position of the non opaque sections 106. In other words, the circumferential position of the non opaque sections 106 relative to the optical core 100 is non critical from the cable identification point of view. This advantageously simplifies the manufacturing process of cable 1.

On the other hand, according to particularly advantageous embodiments, the circumferential position of the opaque sections 105 is chosen for purposes other than cable identification. For instance, the opaque sections 105 may indicate a circumferential position at which the sheath 101 may be safely cut, namely without the risk of damaging either the cable core 100 or the blade(s) of the cutting tool. For instance, in case the cable comprises one or more strength members (e.g. steel strength members, instead of or in addition to the central strength member 104) embedded within the thickness of the sheath 101 (in particular, within the thickness of the non opaque sections 106), the opaque sections 105 may be spaced apart by a certain angle (e.g.) 90° from the strength member(s). This way, the opaque sections 105 indicate the circumferential positions at which longitudinal cuts may be made in the sheath 101 with minimum risk that the blades strike the strength members. Furthermore, since the strength members are embedded within the thickness of the non opaque sections 106, they are visible from outside the cable 1. The operator may then check their position while she/he makes the cuts, in order to make sure that the blades do not strike the strength member(s).

According to such variants, the opaque sections 105 of the sheath 101 are optionally provided with grooves or notches. Such grooves or notches advantageously guides the blades of the cutting tool, in order to minimize the possibility of deviations from the optimal cut position which minimizes the risk to strike the strength members.

According to such variants, if the opaque sections 105 have a lower fracture toughness than the non opaque sections 106, the operation of removing the sheath 101 from the cable 1 is advantageously further eased. Indeed, after cutting short longitudinal cuts (namely, cuts of few centimeters) in the opaque sections 105, thereby dividing the sheath 101 into two substantially identical half-sheaths (each half-sheath including one of the opaque sections 106 with higher fracture toughness), the operator may grip the two half-sheaths with her/his hands and pull them apart. The pulling force causes the opaque sections 105 to fracture, thereby propagating the initial short cuts longitudinally along the sheath 101 through its whole thickness. The half-sheaths may be pulled until the cuts in the sheath 101 have propagated for the desired length, e.g. some meters. The sheath 101 is therefore easily removed in a very safe way, since blades are needed only to make the initial short cuts that are successively propagated by hand over the desired length.

Figure 2:
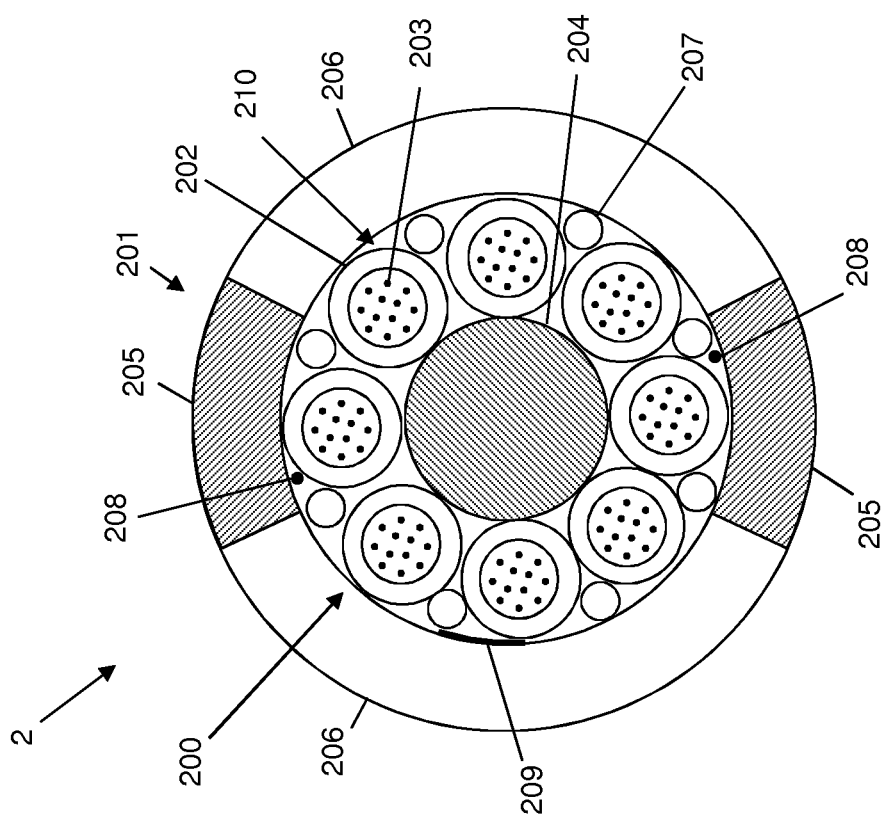
FIG. 2 is a cross-section view of an optical cable according to a second embodiment of the present invention.

FIG. 2 shows an optical cable 2 according to a second embodiment of the present invention.

Similarly to cable 1, also cable 2 is a multi-loose tube cable for terrestrial networks. In particular, cable 2 comprises an optical core 200 and an external sheath 201 surrounding the optical core 200. The optical core 200 comprises a number of optical units 210, each optical unit 210 in turn comprising a respective colored buffer tube 202 and a respective number of optical fibers 203 loosely arranged within the buffer tube 202. The optical core 200 also preferably comprises a central non-metallic strength member 204 and the optical fiber units 210 are preferably stranded around the strength member 204. The sheath 201 comprises two first longitudinally extending sections 205 made of an opaque material and two second longitudinally extending sections 206 made of a non opaque material. The cable 2 further comprises a number of water blocking elements 207 configured to substantially fill the free spaces amongst the optical fiber units 210 within the sheath 201. The cable 2 also comprises two optional ripcords 208.

The above elements of cable 2 correspond to those of cable 1 and have substantially the same features. Therefore, a detailed description thereof will not be repeated.

However, differently from cable 1, in cable 2 no alphanumeric information relating to the cable 2 is printed on the outer surface of the opaque sections 205 of the sheath 201, while a tape 209 carrying such alphanumeric information is provided within the cable 2. In particular, the tape 209 is preferably arranged between the optical core 200 (in particular, the buffer tubes 202) and the sheath 201.

The tape 209 may be a tape provided for by a known standard cable construction for purposes other than cable identification, e.g. a barrier tape or a binder. In such case, the tape 209 carries out barrier function or retaining function and, moreover, identification function. Alternatively, the tape 209 may be an additional tape dedicated to identification purpose only.

The tape 209 may be made of an opaque material, such as paper, an opaque polymeric material, metal and so on. For instance, in case the tape 209 is a barrier tape, it is preferably made of APL (aluminum polymer laminates). Alternatively, the tape 209 may be made of a non opaque material, e.g. a transparent or translucent polymeric material.

The tape 209 may be arranged parallel to the longitudinal axis of the cable 2. In such case, the tape 209 is preferably aligned with one of the non opaque sections 206 of the sheath 201 (as shown in FIG. 2), so that it is visible from outside the cable 2 through such non opaque section 206. Alternatively, the tape 209 may be wound around the optical units 210 (which is the case when the tape 209 is a barrier tape or a binder).

The width of the tape 209 is preferably narrower than the width of each one of the non opaque sections 206 of the sheath 201. This way, if the tape 209 is arranged longitudinally and aligned with one of the non opaque sections 206 of the sheath 201, the buffer tubes 202 (and their color sequence) are still visible from outside the cable 2 through that non opaque portion 206. If the tape 209 is instead wound about the optical units 210, its winding pitch is preferably such that each pair of consecutive coils leave a portion of the optical units 210 uncovered, so that it is visible from outside the cable 2 through the non opaque sections 206. These latter features are of course not needed if the tape 209 is made of non opaque material.

The alphanumeric information relating to the cable 2 are preferably printed on the tape 209 by an ink-jet printing technique. The alphanumeric information relating to the cable 2 are preferably repeated periodically along the tape 209 at predefined intervals of e.g. 1 meter. As described above, such alphanumeric information may comprise for instance: sequential length mark, fiber count of cable 2, logo of the cable manufacturer and year of manufacture.

Alternatively to or in addition to the alphanumeric information, the tape 209 may have a specific color which, together with the colors of the buffer tubes 202, forms a color code identifying the cable 2. According to advantageous variants, the tape 209 may be replaced by a yarn having such specific color. Further, the cable may include both tape (e.g. transparent tape with alphanumeric information) and a colored yarn. The specific color of the tape or yarn may be e.g. indicative of the cable manufacturer site.

Similarly to the cable 1, also the cable 2 may be easily identified by the operator. Indeed, also in such cable a visual inspection of the inner cable structure through any of the non opaque sections 206 of the sheath 201 reveals an ordered sequence of colors, namely the colors of the buffer tubes 202, which is periodically repeated at each stranding pitch of the buffer tubes 102 over the whole length of the cable 2, and which accordingly acts as an identification code for the cable 2.

Also in this embodiment, therefore, the buffer tubes 202 themselves are exploited for identification purposes. This entails the same advantages as for cable 1, namely: easiness of the identification operation over the whole cable length, no restriction on the maximum cable length, no need of coupling to light source, no additional elements for identification purposes increasing cable size and cost, immunity of identification code against abrasion and tampering, possibility of uniquely identifying a very high number of cables, possibility to locate stranding reversal points of the buffer tubes, non critical position of the non opaque sheath section relative to buffer tubes.

In addition, according to the second embodiment, also the alphanumeric information relating to the cable 2 are immune from sheath abrasions due to friction of the cable 2 against other cables or walls of the duct. Indeed, according to the second embodiment the alphanumeric information are printed on the tape 209, which is safely enclosed within the sheath 201 that mechanically protects it against any abrasion. For the same reason, cable 2 is even more safe from the security/traceability point of view, since also its alphanumeric information can not be tampered. The color of the tape (or yarn) moreover further increases the number of color combinations that may be assigned to the various cables for identifying them.

Figure 3:
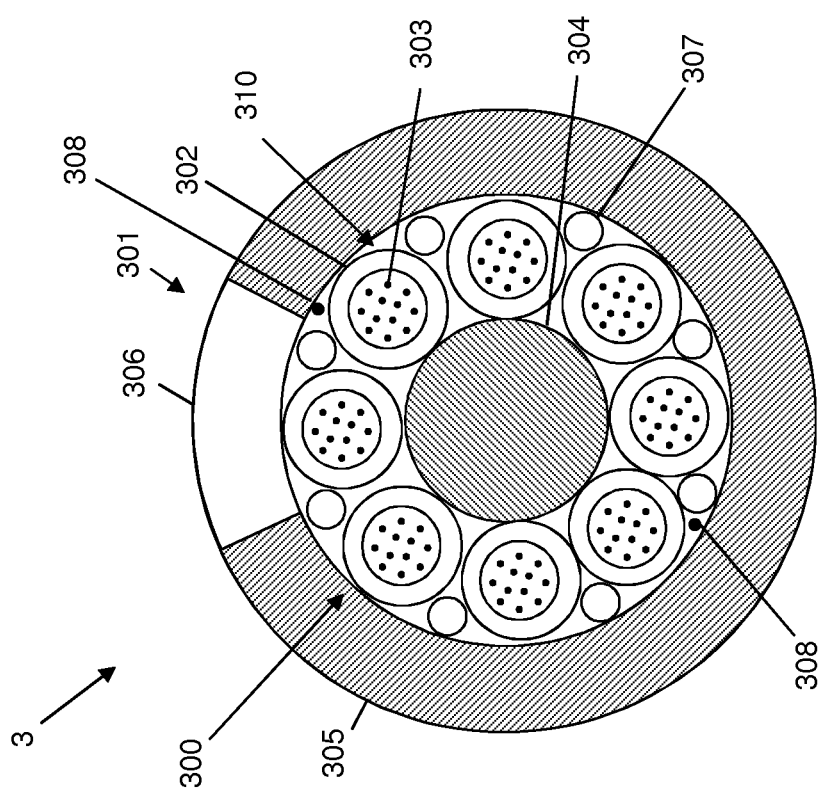
FIG. 3 is a cross-section view of an optical cable according to a third embodiment of the present invention.

FIG. 3 shows an optical cable 3 according to a third embodiment of the present invention.

Similarly to cables 1 and 2, also cable 3 is a multi-loose tube cable for terrestrial networks. In particular, cable 3 comprises an optical core 300 and an external sheath 301 surrounding the optical core 300. The optical core 300 comprises a number of optical units 310, each optical unit 310 in turn comprising a respective colored buffer tube 302 and a respective number of optical fibers 303 loosely arranged within the buffer tube 302. The optical core 300 also preferably comprises a central non-metallic strength member 304 and the optical fiber units 310 are preferably stranded around the strength member 304. The sheath 301 comprises both an opaque material and a non opaque material. The cable 3 further comprises a number of water blocking elements 307 configured to substantially fill the free spaces amongst the optical fiber units 310 within the sheath 301. The cable 3 also comprises two optional ripcords 308.

The above cable elements of cable 3 correspond to those of cables 1 and 2 and have substantially the same features. Therefore, a detailed description thereof will not be repeated.

However, differently from the cables 1 and 2, in cable 3 the sheath 301 comprises a single opaque section 305 and a single non opaque section 306, the non opaque section 306 having an angular width narrower than the opaque section 305. In particular, according to the third embodiment the angular width of the opaque section 305 is preferably higher than 270°, whereas the angular width of the non opaque section 306 is preferably lower than 90°. More preferably, the angular width of the non opaque section 306 is comprised between 40° and 70°, whereas the angular width of the opaque section 305 is comprised between 290° and 320°.

According to other embodiments not shown in the drawings, the sheath 301 may comprise two or more non opaque sections 306 arranged (e.g. evenly distributed) along the perimeter of the sheath 301.

Preferably, the opaque section 305 is provided with alphanumeric information relating to the cable 3. The alphanumeric information relating to the cable 3 are preferably printed on the outer surface of the opaque section 305 by an ink-jet printing technique. The alphanumeric information relating to cable 3 are preferably repeated periodically along the opaque section 305 at predefined intervals of e.g. 1 meter. As mentioned above, such alphanumeric information may comprise for instance: sequential length mark, fiber count of cable 3, logo of the cable manufacturer and year of manufacture.

According to the third embodiment, the non opaque section 306 may exhibit an optional groove or notch. The groove in the non opaque section 306 advantageously eases removal of the sheath 301 from the cable 3. As explained above, this is particularly advantageous for cables which comprise strength member(s) embedded within the thickness of the sheath. In particular, by embedding the strength member(s) within the thickness of the opaque section 305 and by positioning the non opaque section 306 spaced apart by a certain angle from the strength member(s), the non opaque section 306 indicates the preferred cut position wherein the risk of striking the strength member(s) by the blade is minimal. The groove in the non opaque section 306 helps preventing deviations of the blade from such preferred cut position. The operator may also visually check that there is no strength member embedded within the non opaque section 306.

Optionally, the non opaque material of the second sheath section 306 has a lower fracture toughness than the opaque material of the first sheath section 305. This further eases the operation of removing the sheath 301 from the cable 3. Indeed, after cutting a short longitudinal cut (namely, a cut of few centimeters) in the non opaque section 306, the operator may insert a finger in the cut and make it slide along the cable length, thereby pulling apart the cut edges of the non opaque section 306. The pulling force causes the non opaque section 306 to fracture along the longitudinal direction, thereby propagating the initial short cut longitudinally along the sheath 301 through its whole thickness.

Therefore, while in cables 1 and 2 the opaque sections 105, 205 constitute two longitudinal narrow strips which optionally carry the alphanumeric information relating to the cable 3 and which, optionally, may also ease removal of the sheath from cable, in cable 3 the non opaque section 306 constitutes a longitudinal narrow window allowing visual inspection of the cable inner structure and which, optionally, may also ease removal of the sheath 301 from cable 3.

Figure 4:
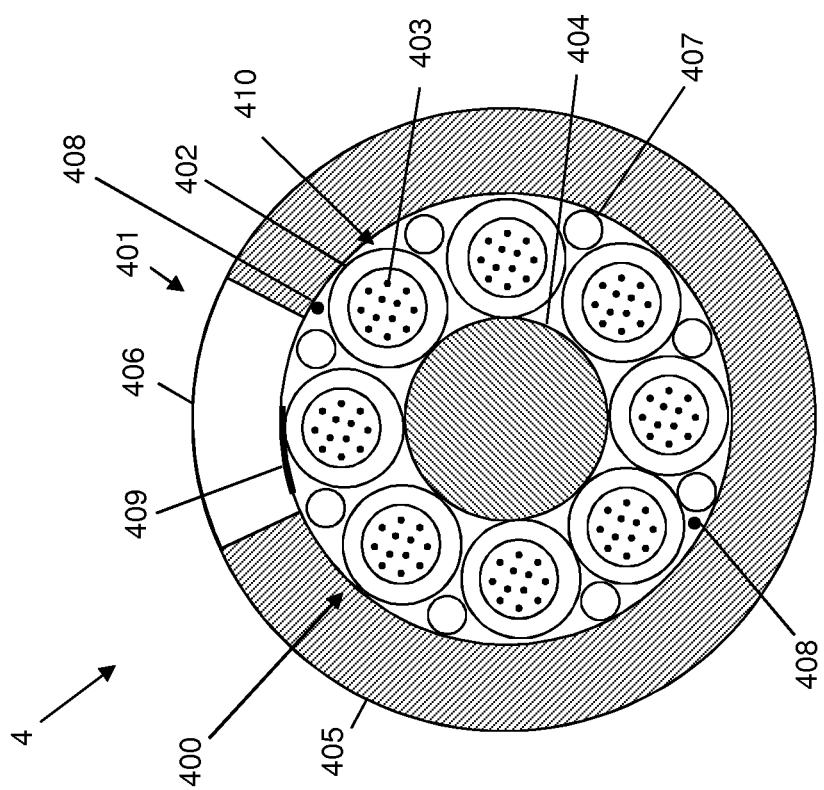
FIG. 4 is a cross-section view of an optical cable according to a fourth embodiment of the present invention.

FIG. 4 shows an optical cable 4 according to a fourth embodiment of the present invention.

Similarly to cables 1, 2 and 3, also cable 4 is a multi-loose tube cable for terrestrial networks. In particular, cable 4 comprises an optical core 400 and an external sheath 401 surrounding the optical core 400. The optical core 400 comprises a number of optical units 410, each optical unit 410 in turn comprising a respective colored buffer tube 402 and a respective number of optical fibers 403 loosely arranged within the buffer tube 402. The optical core 400 also preferably comprises a central non-metallic strength member 404 and the optical fiber units 410 are preferably stranded around the strength member 404. The sheath 401 comprises a first longitudinally extending section 405 made of an opaque material and a second longitudinally extending section 406 made of a non opaque material. The cable 4 further comprises a number of water blocking elements 407 configured to substantially fill the free spaces amongst the optical fiber units 410 within the sheath 401. The cable 4 also comprises two optional ripcords 408.

The above cable elements of cable 4 correspond to those of cable 3 and have substantially the same features. Therefore, a detailed description thereof will not be repeated.

In particular, similarly to cable 3, the non opaque section 406 of the sheath 401 has an angular width narrower than the opaque section 405 of the sheath 401, so that the opaque section 405 constitutes the most part of sheath 401, whereas the non opaque section 406 constitutes a narrow window longitudinally extending along the sheath 401.

Also according to the fourth embodiment, the non opaque section 406 may exhibit an optional groove or notch, in order to ease removal of the sheath 401 from the cable 4. In order to further ease removal of the sheath 401, the non opaque material of the second sheath section 406 preferably has a lower fracture toughness than the opaque material of the first sheath section 405.

However, differently from the cable 3, no alphanumeric information relating to the cable 4 is printed on the outer surface of the opaque section 405 of the sheath 401, while a tape 409 carrying such alphanumeric information is provided within the cable 4. In particular, similarly to the tape 209 shown in FIG. 2, the tape 409 is preferably arranged between the optical core 400 (in particular, the buffer tubes 402) and the sheath 401. The features of the tape 409 are similar to those of the tape 209 shown in FIG. 2. Therefore, a detailed description will not be repeated.

Therefore, similarly to the second embodiment, also in cable 4 according to the fourth embodiment the alphanumeric information relating to the cable 4 are immune from sheath abrasions due to friction of the cable 4 against other cables or walls of the duct. Indeed, according to the fourth embodiment the alphanumeric information are printed on the tape 409, which is safely enclosed within the sheath 401 that mechanically protects it against any abrasion. For the same reason, cable 4 is even safer from the security/traceability point of view, since also its alphanumeric information can not be tampered.

The invention claimed is:

1. An optical cable comprising an optical core and an external sheath enclosing said optical core, wherein:
   said optical core comprises a number of optical units having respective colors and being wound about a longitudinal axis of said cable; and
   said external sheath comprises:
      a non opaque longitudinal section through which a sequence of colors of said optical units is visible from outside said cable; and
      an opaque longitudinal section complementary to the non opaque longitudinal section.

2. The optical cable according to claim 1, wherein an angular width of said opaque longitudinal section is lower than an angular width of said non opaque longitudinal section.

3. The optical cable according to claim 2, wherein said opaque longitudinal section is provided with a groove or notch.

4. The optical cable according to claim 2, wherein said opaque longitudinal section is provided with alphanumeric information relating to said cable.

5. The optical cable according to claim 1, wherein an angular width of said opaque longitudinal section is higher than an angular width of said non opaque longitudinal section.

6. The optical cable according to claim 5, wherein said non opaque longitudinal section is provided with a groove or notch.

7. The optical cable according to claim 5, wherein said non opaque longitudinal section is provided with alphanumeric information relating to said cable.

8. The optical cable according to claim 1, wherein said non opaque longitudinal section is clear.

9. The optical cable according to claim 1, wherein said non opaque longitudinal section is tinted by a color different from a color of said opaque longitudinal section.

10. The optical cable according to claim 1, further comprising an elongated identification element arranged between said optical core and said external sheath so as to be visible from outside said cable through said non opaque longitudinal section of said external sheath.

11. The optical cable according to claim 10, wherein said elongated identification element comprises a tape provided with alphanumeric information relating to said cable.

12. The optical cable according to claim 10, wherein said elongated identification element is arranged parallel to said longitudinal axis of said cable underneath said non opaque longitudinal section of said external sheath.

13. The optical cable according to claim 10, wherein said elongated identification element is wound about said longitudinal axis of said cable.

14. A process for manufacturing an optical cable, said process comprising:
   providing an optical core comprising a number of optical units having respective colors and being wound about a longitudinal axis of said cable; and
   forming an external sheath enclosing said optical core, wherein said external sheath includes a non opaque longitudinal section through which a sequence of colors of said optical units is visible from outside said cable, and said external sheath further includes an opaque longitudinal section complementary to the non opaque longitudinal section.

15. An optical cable, comprising:
   an optical core including a number of optical units having respective colors and being wound about a longitudinal axis of the cable;
   an external sheath enclosing the optical core, the external sheath including a non opaque longitudinal section through which a sequence of colors of said optical units is visible from outside said cable; and
   an elongated identification element arranged between the optical core and the external sheath so as to be visible from outside the cable through the non opaque longitudinal section of the external sheath.

16. The optical cable according to claim 15, wherein the elongated identification element includes a tape provided with alphanumeric information relating to the cable.

17. The optical cable according to claim 16, wherein at least a portion of the tape is non opaque.

18. The optical cable according to claim 15, wherein the elongated identification element has a color forming a code in combination with the respective colors of the optical units.

19. The optical cable according to claim 15, wherein the elongated identification element is arranged parallel to the longitudinal axis of the cable underneath the non opaque longitudinal section of the external sheath.

20. The optical cable according to claim 15, wherein the elongated identification element is wound about the longitudinal axis of said cable.

* * * * *